US012669011B2

(12) United States Patent
Wang

(10) Patent No.: US 12,669,011 B2
(45) Date of Patent: Jun. 30, 2026

(54) ROLLING SHUTTER DOOR FENCE

(71) Applicant: GUANGZHOU TUSUNNY HOME PRODUCTS CO., LTD, Guangzhou (CN)

(72) Inventor: Hongjuan Wang, Guangzhou (CN)

(73) Assignee: GUANGZHOU TUSUNNY HOME PRODUCTS CO., LTD, Guangzhou (CN)

( * ) Notice: Subject to any disclaimer, the term of this patent is extended or adjusted under 35 U.S.C. 154(b) by 268 days.

(21) Appl. No.: 18/419,935

(22) Filed: Jan. 23, 2024

(65) Prior Publication Data

US 2025/0101800 A1 Mar. 27, 2025

(30) Foreign Application Priority Data

Sep. 21, 2023 (CN) ........................ 202311230794.6

(51) Int. Cl.
*E06B 9/00* (2006.01)
*E06B 9/13* (2006.01)
(Continued)

(52) U.S. Cl.
CPC ................. *E06B 9/17* (2013.01); *E06B 9/13* (2013.01); *E06B 9/171* (2013.01); *E06B 9/58* (2013.01);
(Continued)

(58) Field of Classification Search
CPC ........ E06B 2009/002; E06B 9/08; E06B 9/13; E06B 9/171; E06B 9/17; E06B 9/60; E06B 9/78; E05B 65/00
See application file for complete search history.

(56) References Cited

U.S. PATENT DOCUMENTS 6,375,165 B1 * 4/2002 Sherratt .................... E06B 9/08 256/1
6,536,502 B2 * 3/2003 Britto ........................ E06B 9/08 160/293.1

(Continued)

FOREIGN PATENT DOCUMENTS

CN 219012442 U 5/2023
DE 202010007029 U1 * 9/2010 ............... E06B 9/40
DE 202018105095 U1 * 9/2018 ............ E06B 9/174

OTHER PUBLICATIONS

Machine translation DE202018105095 (Year: 2018).*
Machine translation DE202010007029 (Year: 2010).*

*Primary Examiner* — Johnnie A. Shablack
*Assistant Examiner* — Jeremy C Ramsey
(74) *Attorney, Agent, or Firm* — JEEN IP LAW, LLC

(57) ABSTRACT

The present invention discloses a rolling shutter door fence, including a connecting mechanism for connecting with the free end of the roller shutter, the connecting mechanism includes a column and a base provided for the column, the column can be vertically fixed to the installation position through the base, the length of the column, which of course can also be longer, fits with the overall height of the rolling shutter door fence, the present invention having a simple structure allows for direct installation without positioning according to the position of the roller shutter and, compared with traditional methods, optimizes the overall installation process of the roller shutter door fence and effectively improves the installation convenience of the roller shutter door fence.

17 Claims, 6 Drawing Sheets

(51) Int. Cl.
*E06B 9/17* (2006.01)
*E06B 9/171* (2006.01)
*E06B 9/58* (2006.01)
*E06B 9/80* (2006.01)

(52) U.S. Cl.
CPC .......... *E06B 9/80* (2013.01); *E06B 2009/002* (2013.01); *E06B 2009/805* (2013.01)

(56) References Cited

U.S. PATENT DOCUMENTS

| | | | | |
|---|---|---|---|---|
| 9,598,896 | B1 * | 3/2017 | Pichik | E06B 9/13 |
| 11,939,817 | B2 * | 3/2024 | Wang | E06B 9/60 |
| 11,976,515 | B2 * | 5/2024 | Fan | E06B 9/08 |
| 12,338,681 | B1 * | 6/2025 | Bickel | E06B 9/13 |
| 12,359,505 | B2 * | 7/2025 | Wang | E06B 9/00 |
| 2018/0044982 | A1 * | 2/2018 | Wang | E06B 9/08 |
| 2021/0355751 | A1 * | 11/2021 | Liang | E06B 9/60 |
| 2025/0129662 | A1 * | 4/2025 | Wang | E06B 9/60 |

* cited by examiner

ROLLING SHUTTER DOOR FENCE

CROSS-REFERENCE TO RELATED APPLICATIONS

This application claims priority to Chinese Patent Application No. 202311230794.6, filed on Sep. 21, 2023, which is hereby incorporated by reference in its entirety.

TECHNICAL FIELD

The present invention relates to the field of door fence technology, in particular to a rolling shutter door fence.

BACKGROUND

In order to prevent infants and pets, when going outdoors, from getting lost or injured, retractable door fences are often provided for indoor doors, stairwells, or corridors.

The Chinese patent application number CN202320165782.9, for example, discloses an adjustable retractable protective door fence, mainly including components such as upper and lower supports, roller shutter components, and a roller. The roller can be pivotally installed between the upper and lower supports, and the roller shutter can be installed on the roller and pulled out for use. When the roller shutter is not in use, the elastic torque of the spring can drive the roller to rotate and retract the roller shutter. The free end of the roller shutter (i.e. the end away from the roller) is provided with two hooks, which are vertically spaced apart. After the installation of the retractable door fence, two buckles have to be installed in another installation position and need to maintain a height consistent with that of the two hooks. After the roller shutter is pulled out, the two buckles can be connected with the two hooks to fix the roller shutter and, the buckles and hooks can be disconnected to retract the roller shutter.

It is very troublesome to install buckles because two buckles are usually used to maintain the flatness of the roller shutter, which need to be positioned and installed according to the height and position of the hooks. After the installation of the buckles, a height difference will often occurs between the hooks and the buckles, causing the buckles to be misaligned and unable to be fastened, and the buckles must be repositioned and installed.

In view of this, the applicant believes that it is urgent to propose a connecting mechanism that can be directly installed without positioning and installation based on the position of the roller shutter.

SUMMARY

The main purpose of the present invention is to propose a rolling shutter door fence, solving the problems proposed in the background art mentioned above.

To achieve the above purpose, the present invention proposes a rolling shutter door fence, including an upper support, a lower support, a scroll that can be pivotally installed between the upper support and the lower support, and a roller shutter located on the scroll, also including a connecting mechanism for connecting to the free end of the roller shutter, the connecting mechanism includes a column, and the column is provided with a base for connecting to the installation position, the column can be vertically fixed at the installation position through the base, and the connecting mechanism is also provided with a locking mechanism for locking the free end of the roller shutter.

The technical solution of the present invention includes a connecting mechanism for connecting with the free end of roller shutter, the connecting mechanism includes a column and a base provided for the column, the column can be vertically fixed to the installation position through the base, the length of the column, which of course can also be longer, fits with the overall height of the rolling shutter door fence, and during installation the connecting mechanism therefore can be directly installed in any position without positioning and, after the roller shutter is pulled out, can directly connect the free end of the roller shutter to the column or base and lock them through a locking mechanism, the present invention having a simple structure allows for direct installation without positioning according to the position of the roller shutter and, compared with traditional methods, optimizes the overall installation process of the roller shutter door fence and effectively improves the installation convenience of the roller shutter door fence.

DESCRIPTION OF EMBODIMENTS

The technical solutions in the embodiments of the present invention will be described clearly and completely in conjunction with the accompanying drawings of the embodiments of the present invention. Obviously, the described embodiments are only a part of the embodiments of the present invention, rather than all the embodiments. Based on the embodiments of the present invention, all other embodiments obtained by those of ordinary skill in the art without creative work shall fall within the protection scope of the present invention.

It should be noted that all directional indicators (such as up, down, left, right, front, back, top, bottom, inside, outside, vertical, horizontal, vertical, counterclockwise, clockwise, circumferential, radial, axial . . . ) in the embodiments of the present invention are only used to explain the relative position relationship and movement among various components in a particular posture (as shown in the accompanying drawings), and if that particular posture is changed, the directional indications will change accordingly.

In addition, descriptions involving terms “first,” “second” and the like, if any, in the present invention are only for illustrative purposes and cannot be understood as indicating or implying relative importance or the number of features referred to. Therefore, the features defined with “first” and “second” may explicitly or implicitly include at least one or a plurality of the features. At the same time, the technical solutions of various embodiments can be combined with each other, but must be based on what those of ordinary skill in the art can achieve. The combination of technical solutions that result in contradiction or make it impossible to implement should be considered non-existent, and accordingly should not fall within the scope of protection required by this present invention.

The present invention proposes a rolling shutter door fence.

Figure 1:
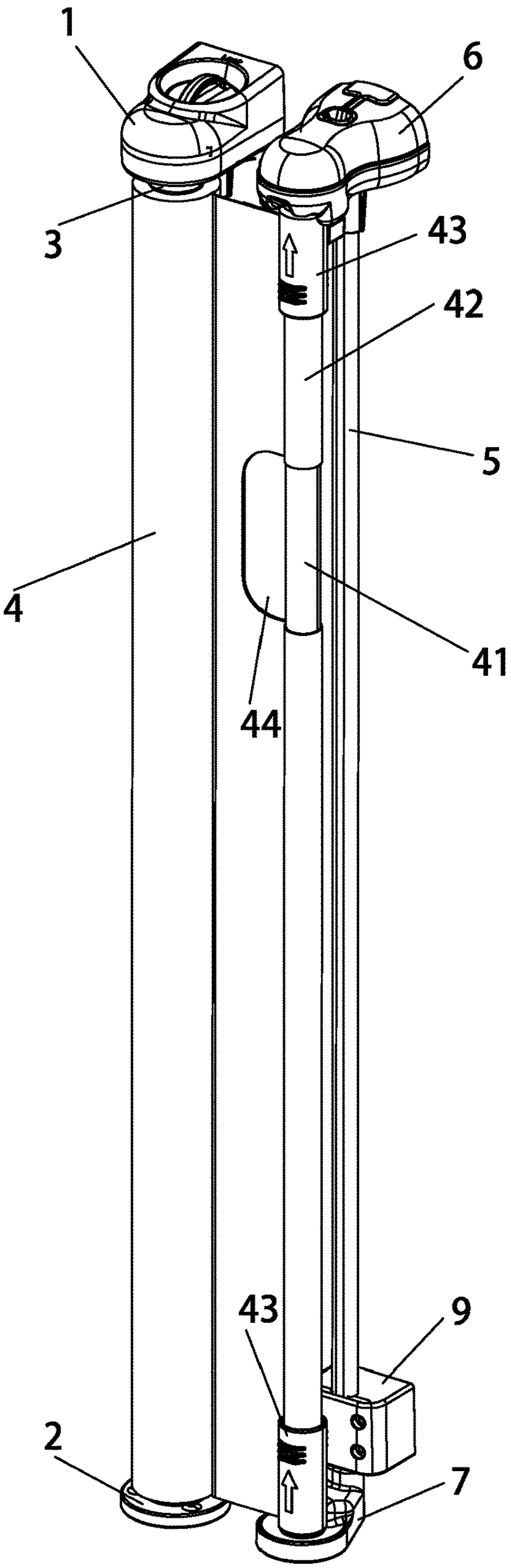
FIG. 1 is a three-dimensional view of the present invention.
Figure 2:
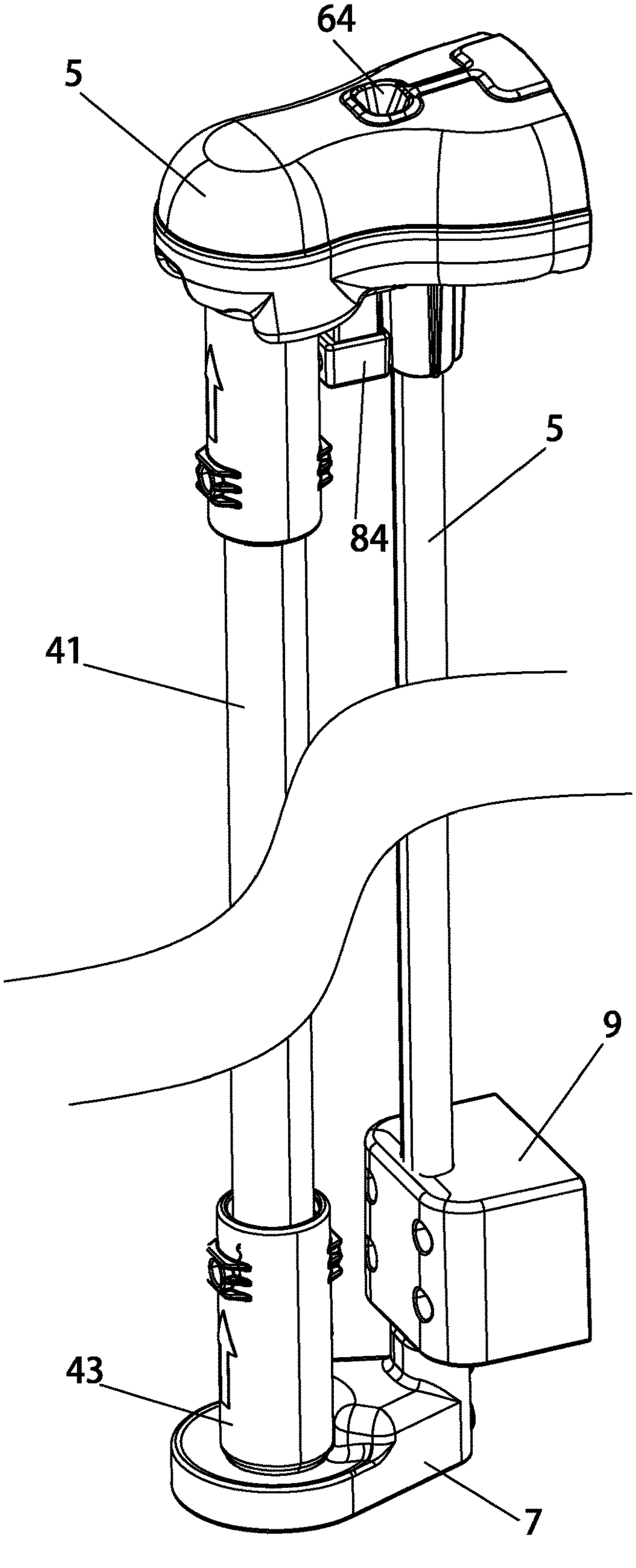
FIG. 2 is an assembly diagram of the upper connecting base, lower connecting base, and support rod.
Figure 3:
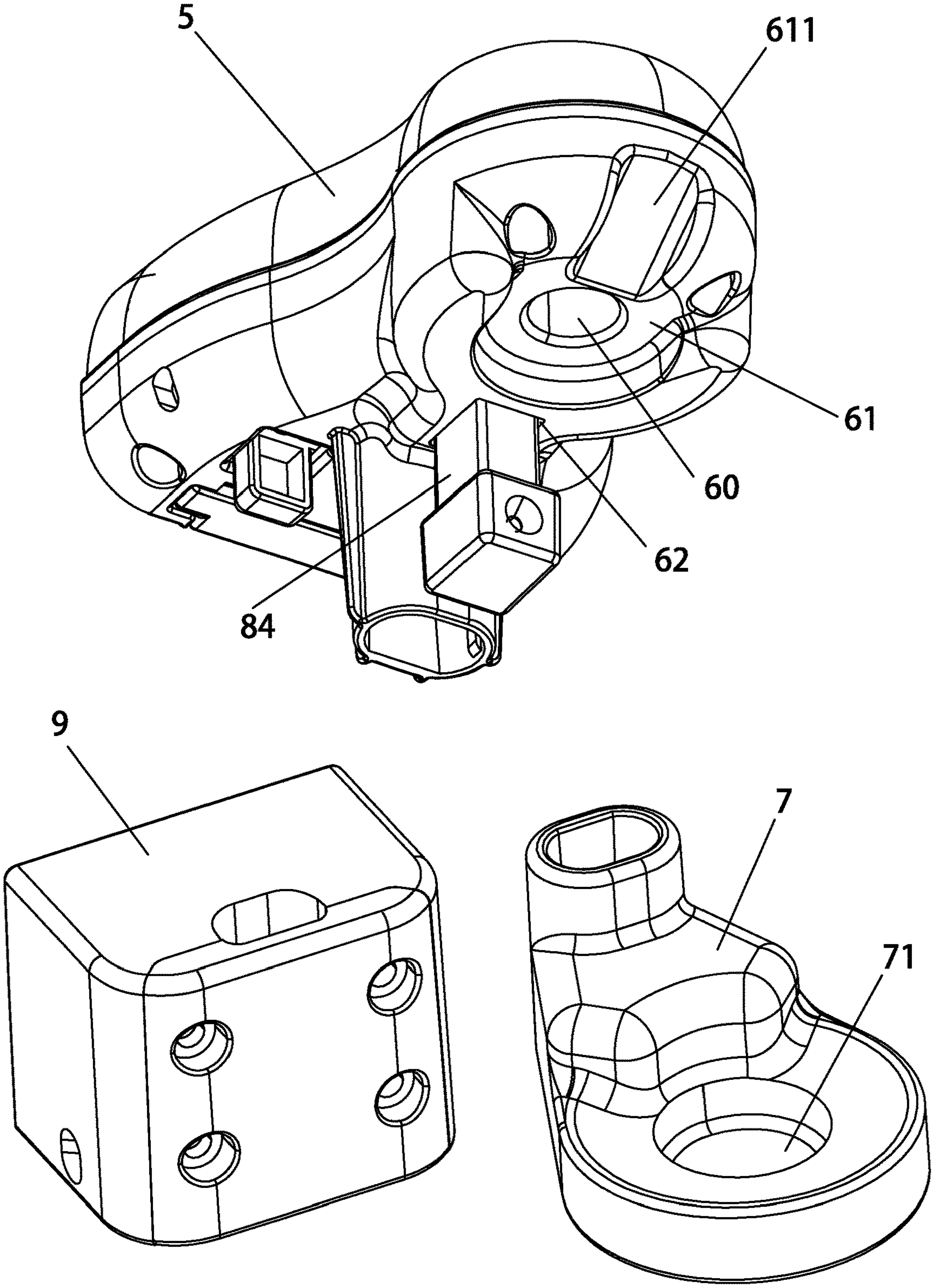
FIG. 3 is a three-dimensional view of the upper connecting base, lower connecting base, and movable base.
Figure 4:
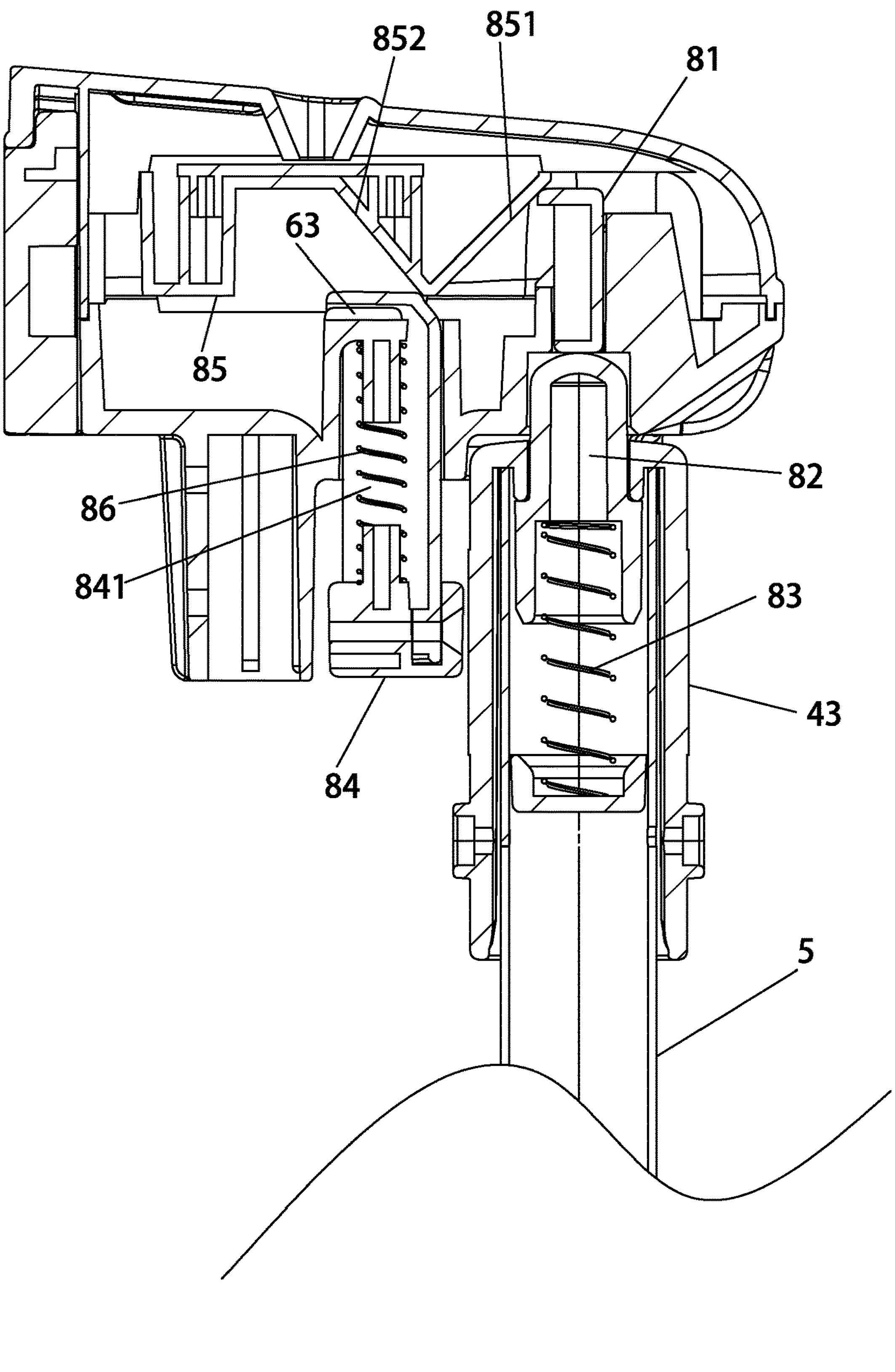
FIG. 4 is a sectional view of the upper connecting base.
Figure 5:
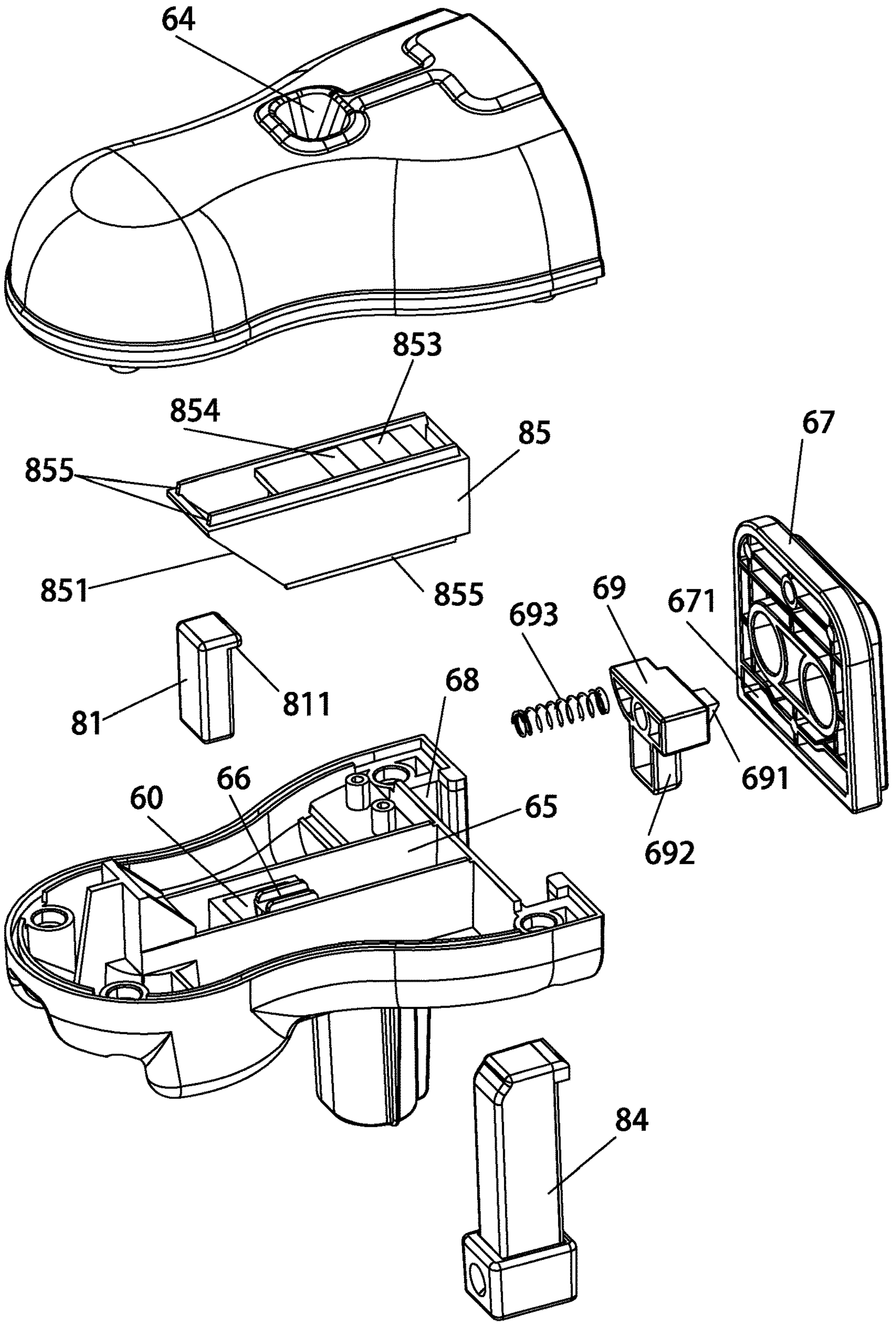
FIG. 5 is an exploded view of the upper connecting base.
Figure 6:
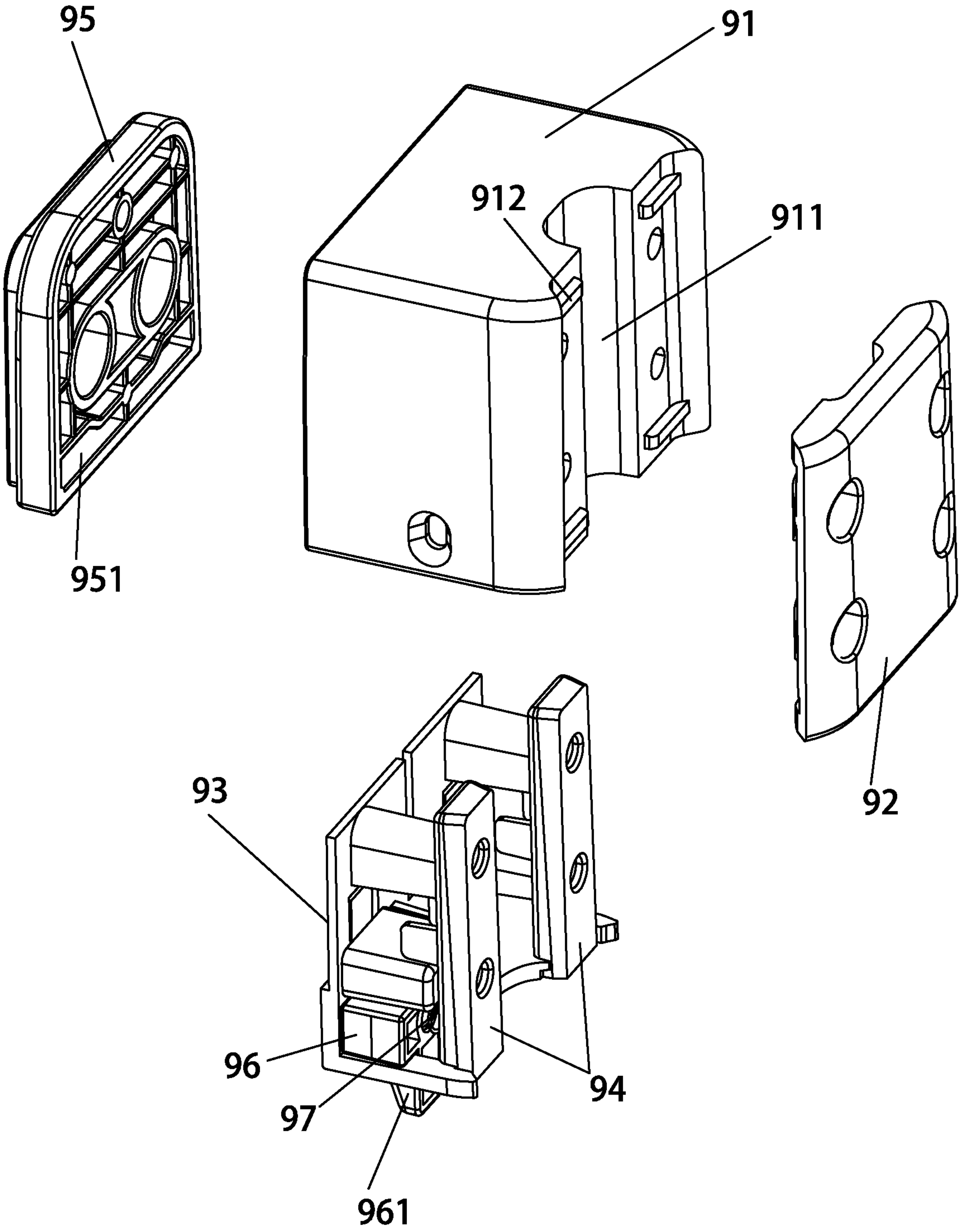
FIG. 6 is an exploded view of the movable base.

In the embodiments of the present invention, as shown in FIGS. 1 to 6, the rolling shutter door fence includes an upper support 1, a lower support 2, a scroll 3 that can be pivotally installed between the upper support 1 and the lower support 2, and a roller shutter 4 located on the scroll 3, also including a connecting mechanism for connecting to the free end of the roller shutter 4, the connecting mechanism includes a column 5, and the column 5 is provided with a base for connecting to the installation position, the column 5 can be vertically fixed at the installation position through the base, and the connecting mechanism is also provided with a locking mechanism for locking the free end of the roller shutter.

The technical solution of the present invention includes a connecting mechanism for connecting with the free end of roller shutter, the connecting mechanism includes a column and a base provided for the column, the column can be vertically fixed to the installation position through the base, the length of the column, which of course can also be longer, fits with the overall height of the rolling shutter door fence, and during installation the connecting mechanism therefore can be directly installed in any position without positioning and, after the roller shutter is pulled out, can directly connect the free end of the roller shutter to the column or base and lock them through a locking mechanism, the present invention having a simple structure allows for direct installation without positioning according to the position of the roller shutter and, compared with traditional methods, optimizes the overall installation process of the roller shutter door fence and effectively improves the installation convenience of the roller shutter door fence.

Specifically, the free end of the roller shutter 4 can be detachably connected to the column 5 or the connecting base. In the embodiment in which the free end of the roller shutter 4 is detachably connected to the column 5, the free end of the roller shutter 4 is provided with a hook that fits the column 5. After the roller shutter 4 is pulled out, the free end of the roller shutter 4 can be fixed through the fit coordination between the hooks and the hook of the column 5. In order to strengthen the connection between the free end of the roller shutter 4 and the connecting mechanism, and avoid easy separation between the hook and the column 5, the locking structure in the prior art, such as screw, buckle structure, can be used to lock the hook and column 5 after the hook is connected to column 5, thus the specific structural principle of such structures is not elaborated here. Of course, in this embodiment, the hook can also be replaced by items such as straps, buckles, and ropes with Velcro.

In this embodiment, the free end of roller shutter 4 is detachably connected to the connecting base: the free end of the roller shutter 4 is provided with a support rod 41, and the base includes an upper connecting base 6 and a lower connecting base 7 respectively disposed at the top and bottom of the column 5, a first slot 6 for the top of the support rod 41 to be inserted and a second slot 71 for the bottom of the support rod 41 to be inserted are respectively formed at the bottom of the upper connecting base 6 and on the top of the lower connecting base 7, the locking mechanism is used to lock the support rod 41 with the base after the top and bottom of the support rod 41 are inserted into the first slot 61 and the second slot 71, respectively.

Specifically, the upper connecting base 6 and the lower connecting base 7 are integrated with the column 5 or are detachable connecting structures. In case of detachable connecting structures, the upper connecting base 6 and the lower connecting base 7 are respectively inserted into the top and bottom ends of the column 5 and locked by screws or fixed by a buckle structure.

Specifically, the locking mechanism includes a first slider 81, a vertically extended accommodating groove 60 that fits the first slider 81 on the top wall of the first slot 61, and the first slider 81 is movably installed in the accommodating groove 60 and can perform vertical reciprocating motion relative to the accommodating groove 60.

In an embodiment, the top of the support rod 41 is provided with a locking hole, and after the top of the support rod 41 is inserted into the first slot 61, the locking hole is aligned up and down with the first slider 81. To install the support rod 41, first insert the bottom end of the support rod 41 into the second slot 71, and then clip the top end of the support rod 41 into the first slot 61, aligning the locking hole with the first slider 81 up and down, and then the first slider 81 descends and the lower end of the first slider 81 inserts into the locking hole, so that the top of the support rod 41 cannot exit the first slot 61, thereby locking the top of the support rod 41 with the upper connection base 6. In further, because the top of the support rod 41 is locked, the bottom end of the support rod 41 cannot exit the second slot 71, thus locking the support rod 41 with the base. When the first slider 81 rises, the lower end of the first slider 81 will exit the locking hole, releasing the locking between the support rod 41 and the base. In this embodiment, the first slider 81 is quite long. As for how to drive the first slider 81 to perform vertical reciprocating motion in this embodiment, a driving component connected to the first slider 81 can be provided on the upper connecting base 6, and the driving component can be manually controlled to drive the first slider 81 to perform vertical reciprocating motion. Of course, reference can also be made to the driving structure in prior art, which will not be further elaborated here.

In this embodiment, a locking element 82 is movably provided at the top of the support rod 41, and the locking element 82 can move between the positions where the locking element 82 retracts into the support rod 41 and extends into the accommodating groove 60 to force the first slider 81 is to move upward, the support rod 41 is internally provided with a first top spring 83 that is connected to the locking element 82, and through the first top spring 83, elastic force is applied to the locking element 82 to force the first slider 81 to move upward. To install the support rod 41, first insert the bottom end of the support rod 41 into the second slot 71, and then clip the top end of the support rod 41 into the first slot 61. External force, such as manual pressing, can be used to force the locking element 82 into the interior of the support rod 41, and at the same time, clip the top end of the support rod 41 into the first slot 61, or during the clipping process, the pressure generated by the contact between the outer wall of the upper connecting base 6 and the locking element 82 can force the locking element 82 to automatically retreat into the interior of the support rod 41, and the top of the support rod 41 is clipped into the first slot 61, the external force applied to the locking element 82 disappears. The elastic force of the first top spring 83 forces the locking element 82 to extend into the accommodating groove 60 and lift the first slider 81. The locking element 82 located in the accommodating groove 60 can restrict the top of support rod 41 from exiting the first slot 61, thereby locking the upper end of support rod 41 with the upper connecting base 6. In further, because the top end of the support rod 41 is being locked, the bottom end of the support rod 41 cannot exit the second slot 71, thus locking the support rod 41 with the base. The first slider 81 descends to contact and force the locking element 82 to retreat into the interior of the support rod 41. After the top of the support rod 41 is released, the top of the support rod 41 can be taken out of the first slot 61 and the bottom of the support rod 41 can be taken out of the second slot 71, so that the support rod 41 and the connecting mechanism are disassembled.

Specifically, in this embodiment, the locking mechanism further includes a second slider 84 and a third slider 85, the second slider 84 is movably installed at the bottom of the upper connecting base 6 and can perform vertical reciprocating motion relative to the upper connecting base 6, and the upper end of the second slider 84 is located inside the upper connecting base 6, the third slider 85 is movably installed inside the upper connecting base 6, and the side of the third slider 85 near the first slider 81 and the side of the third slider 85 near the second slider 84 are respectively provided with a first inclined plane 851 for contacting the first slider 81 and a second inclined plane 852 for contacting the upper end of the second slider 84, the first inclined plane 851 and the second inclined plane 852 are opposite in the inclination direction, the third slider 85 can move between the position where the third slider 85 forces the first slider 81 to perform downward motion through the first slope 851 and the position where the third slider 85 forces the second slider 84 to perform downward motion through the second slope 852. When the second slider 84 performs an upward movement by external force, such as manual pressing, the upper end of the second slider 84 contacts the second inclined plane 852 and forces the third slider 85 to move in the direction of the first slider 81 through the second inclined plane 852. During the movement, the third slider 85 contacts the upper end of the first slider 81 through the first inclined plane 851 and forces the first slider 81 to perform a downward movement through the first inclined plane 851, forcing the locking element 82 to retreat into the interior of the support rod 41, and on the contrary, when the locking element 82 forces the first slider 81 to perform an upward movement, the upper end of the first slider 81 contacts the first inclined plane 851 and forces the third slider 85 to move in the direction of the second slider 84 through the first inclined plane 851, restoring the third slider 85.

Specifically, one side of the second slider 84 is provided with a guide groove 841, and the bottom of the upper connecting base 6 is provided with a through groove 62 that allows the second slider 84 to vertically pass through, the through groove 62 is connected to the inner part of the upper connecting base 6, and a first limiting portion 63 in the through groove 62 that extends into the guide groove 841 can press against the top of the guide groove 841 to restrict the second slider 84 from detaching from the through groove 62.

Specifically, a second top spring 86 is provided in the guide groove 841, and the upper and lower ends of the second top spring 86 press against the bottom wall of upper connecting base 6 and the bottom wall of guide groove 841, respectively, and elastic force can be applied through the second top spring 86 to the second slider 84 to make the second slider 84 move in the direction withdrawing from the through groove 62.

Specifically, the side of the first limiting portion 63 near the second top spring 86 and the bottom wall of the guide groove 841 are both provided with cylindrical bodies, and the upper and lower ends of the second top spring 86 are respectively sleeved on the two cylindrical bodies.

Specifically, the top wall of the third sliding block 85 is provided with two adjacent signs, the first sign 853 and the second sign 854, the top wall of the upper connecting base 6 is provided with an observation window 64 connected to the interior of the upper connecting base 6, and the third sliding block 85 moves until the locking element 82 is pushed into the interior of support rod 41, the first sign 853 is aligned up and down with the observation window 64; the third slider 85 moves until the locking element 82 extends into the accommodating groove 60 so that the second indicator 854 is aligned up and down with the observation window 64.

Specifically, the positions inside the upper connecting base 6 corresponding to the upper and lower part of the third slider 85 are provided with bottom open and top open moving channels 65, respectively, and the top and bottom walls of the third slider 85 are respectively provided with guiding portions 855 for inserting the two moving channels 65, and the third slider 85 can move along the moving channel 65 with the aid of the guiding portion 855 and the moving channel 65.

Specifically, the first slot 61 is partially open for the top of the support rod 41 to pass through, and a pressure groove 611 that runs obliquely is formed at the open position, and when the top of the support rod 41 passes through the open position, the pressure groove 611 gradually pushes the locking element 82 into the interior of the support rod 41.

Specifically, the position inside the upper connecting base 6 corresponding to the top of the accommodating groove 60 is provided with a locking position 66, and the top of the first sliding block 81 is provided with a second limiting portion 811 that can press against with the locking position 66 up and down to prevent the first slider 81 from completely entering the accommodating groove 60.

Specifically, in this embodiment, the first slider 81 can also be in contact with the first inclined plane 851 through the first limiting portion 63.

Specifically, the edge of the free end of the roller shutter 4 is provided with a kit 42 for wrapping the support rod 41, and is also provided with a cap body 43 for the insertion of the end of the support rod 41, and after the kit 42 wraps the support rod 41, the cap body 43 can wrap and secure the top of the support rod 41 to the top of the kit 42, and wrap and secure the bottom of the support rod 41 to the bottom of the kit 42.

Specifically, the kit 42 and the roller shutter 4 can be of integrated or split structure, and in case of an integrated structure, the edge of the free end of the roller shutter 4 bends and fixes to form the kit 42; in case of a split structure, the kit 42 is fixed to the edge of the free end of the roller shutter 4 through glue fixation, needle thread stitching, or a buckle structure.

Specifically, both ends of the support rod 41 are provided with a cap body 43, and the position of the cap body 43 corresponding to the roller shutter 4 is provided with an avoidance hole (not shown in the figure) for the roller shutter 4 to pass through.

Specifically, a window 44 is provided near the support rod 41 at the free end of the roller shutter 4 for easy gripping of the support rod 41. The avoidance effect of the window 44 allows human palm to fully grasp the support rod 41, avoiding the automatic retraction of roller shutter 4 due to insufficient grasping position of the support rod 41 when the roller shutter 4 is being pulled out.

Specifically, the back of the upper connecting base 6 is fixed by double-sided adhesive or locked to the intended installation position by screws, or reference can be made to the following embodiments: the upper connecting base 6 can be detachably inserted with a first insertion board 67 that is fixed (such as, by double-sided adhesive or by screws) in the installation position, the back of the upper connecting base 6 is provided with a first insertion slot 68 for the bottom-up insertion of the first insertion board 67, and a first locking key 69 having a first locking part 691 and a first driving part 692 is movably provided in the first insertion slot 68, the first insertion board 67 is provided with a first locking position 671 for the insertion of the first locking part 691, and after the first insertion board 67 is inserted into the first insertion slot 68, the first locking part 691 is inserted into the first locking position 671 to restrict the first insertion board 67 from exiting the first insertion slot 68, and in further a third top spring 693 is provided to apply elastic force to the first locking key 69 in the direction that allows the first locking part 691 insert into the first locking position 671. The first driving part 692 can be manually driven to withdraw the first locking part 691 from the first locking position 671 for unlocking purpose.

Specifically, one side of the first locking key 69 is provided with an opening and a closing sign, the upper connecting base 6 is provided with a first observation port that allows to observe the sign, and when the first locking part 691 is in the first locking position 671, the closing sign can be observed from the first observation port, and when the first locking part 691 is not in the first locking position 671, the opening sign can be observed from the first observation port.

Specifically, the lower connecting base 7 is directly connected and fixed to the installation position through screws or a buckle structure, or reference can be made to the following embodiments: since the installation environment in the present invention is usually an indoor wall, and the bottom of the indoor wall is usually provided with a skirting line, making it necessary to increase the installation height of the lower connecting base 7 because of the different distance between the upper connecting base 6 and the wall and the distance between the lower connecting base 7 and the skirting line, however, a excessive height will lead to a too large gap between the lower edge of the roller shutter 4 and the ground, through which pets or infants can pass through. To avoid these problems, in the embodiment, the column 5 is movably provided with a movable base 9 for fixed connection with the installation position, and the movable base 9 can move back and forth along the column 5. When a connecting base is to be installed on a wall with a skirting line, as the movable base 9 can move back and forth along the support rod 41, the movable base 9 can be moved to the position above the corresponding skirting line on the wall and fixed in that position, replacing the lower connecting base 7 to fix in the installation position, without having to adjust the installation height of the lower connecting base 7 and without an excessive gap between the lower edge of the roller shutter 4 and the ground.

Specifically, the moving base 9 includes a shell 91 and a cover body 92, a groove 911 is provided on the front side of the shell 91 that fits the column 5, and the cover body 92 is locked through a plurality of bolts to the front side of the shell 91 and closes the groove 911 to form a channel with the top and bottom open and the column 5 partially covered.

Specifically, a plurality of positioning strips 912 are provided on both sides of the corresponding groove 911 on the front side of the shell 91, the position of the positioning strip 912 corresponding to the cover body 92 is provided with a positioning groove (not shown in the figure), and the assembly of the shell 91 with the cover body 92 can be quickly positioned through the cooperation between the positioning strip 912 and the positioning groove (not shown in the figure).

Specifically, the shell 91 has an open bottom, and a bracket 93 is inserted into the shell 91 from bottom to top and locked, the bracket 93 is provided with a nut hole 94 for the bolt to pass through, and a nut for screwing with the bolt is fixed in the nut hole 94.

Specifically, the bracket 93, after being inserted into the shell 91, is locked by screws, and a barb (not shown in the figure) is provided on the side of the bracket 93 near the back of the shell 91, and a hook hole (not shown in the figure) is provided at the corresponding position of the barb on the back of the shell 91 for the barb to be inserted, so that the combination between the barb and the hook hole can prevent the bracket 93 from withdrawing from the interior of the shell 91.

Specifically, the movable base 9 is detachably inserted with a second insertion board 95 that is fixed (such as, by double-sided adhesive or by screws) at the installation position, the back of the movable base 9 is provided with a second insertion slot (not shown in the figure) for the bottom-up insertion of the second insertion board 95, and a second locking key 96 having a second locking part and a second driving part 961 is movably provided in the second insertion slot (not shown in the figure), the second insertion board 95 is provided with a second locking position 951 for the insertion of the second locking part, and after the second insertion board (95) is inserted into the second insertion slot (not shown in the figure), the second locking part is inserted into the second locking position (951) to restrict the second insertion board (95) from exiting the second insertion slot (not shown in the figure), and in further a fourth top spring (97) is provided to apply elastic force to the second locking key (96) to make the second locking key (96) move in the direction that allows the second locking part insert into the second locking position (951). The second driving part 961 can be manually driven to withdraw the second locking part from the second locking position 951 for unlocking purpose.

Specifically, one side of the second locking key 96 is provided with an opening and a closing sign, the movable base 9 is provided with a second observation port that allows to observe the sign, and when the second locking part is in the second locking position 951, the closing sign can be observed from the first observation port, and when the second locking part is not in the second locking position 951, the opening sign can be observed from the second observation port.

Specifically, the upper support 1 is disposed at the installation position in the same way as the upper connecting base 6, and the lower support 2 is disposed at the installation position in the same way as the movable base 9. Due to the fact that the four door fences of the rolling shutter and the connecting mechanism are assembled by the same buckle structure at the intended installation position, the positions of the two can be freely exchanged without assembling failure due to unsuitable buckle structure after position change.

Specifically, the upper connecting base 6 is assembled through an upper cover and a base.

It should be noted that reference can be made to the prior art for other structures of the rolling shutter door fence, and the specific structural principles are not elaborated here.

The above are only the preferred embodiments of the present invention, and are not intended to limit the present invention. Any equivalent structural transformation made based on the description and accompanying drawings hereof under the concept of present invention, or be directly/indirectly applied in other related technical fields, should fall within scope of patent protection of the present invention.

What is claimed is:

1. A rolling shutter door fence, including; an upper support, a lower support, a scroll that is configured to be pivotally installed between the upper support and the lower support, and a roller shutter located on the scroll, also including a connecting mechanism for connecting to a free end of the roller shutter, the connecting mechanism includes a column, and the column is provided with a base, the column is configured to be vertically fixed through the base, and the connecting mechanism is also provided with a locking mechanism for locking the free end of the roller shutter;

wherein the base includes an upper connecting base and a lower connecting base respectively disposed at a top and a bottom of the column;

wherein the locking mechanism includes a first slider, a second slider and a third slider, the second slider is movably installed at a bottom of the upper connecting base and is configured to perform vertical reciprocating motion relative to the upper connecting base, and an upper end of the second slider is located inside the upper connecting base, the third slider is movably installed inside the upper connecting base;

one side of the third slider near the first slider and one side of the third slider near the second slider are respectively provided with a first inclined plane for contacting the first slider and a second inclined plane for contacting the upper end of the second slider, the first inclined plane and the second inclined plane are opposite in an inclination direction, the third slider is configured to move between a position where the third slider forces the first slider to perform downward motion through the first inclined plane and a position where the third slider forces the second slider to perform downward motion through the second inclined plane.

2. The roller shutter door fence according to claim 1, wherein the free end of the roller shutter is provided with a support rod, a first slot for a top of the support rod to be inserted and a second slot for a bottom of the support rod to be inserted are respectively formed at the bottom of the upper connecting base and on a top of the lower connecting base, the locking mechanism is used to lock the support rod with the base after the top and bottom of the support rod are inserted into the first slot and the second slot, respectively.

3. The roller shutter door fence according to claim 2, wherein the locking mechanism further includes a vertically extended accommodating groove that fits the first slider on a top wall of the first slot, and the first slider is movably installed in the accommodating groove and is configured to perform vertical reciprocating motion relative to the accommodating groove.

4. The roller shutter door fence according to claim 3, wherein a locking element is movably provided at the top of the support rod, and the locking element is configured to move between positions where the locking element retracts into the support rod and extends into the accommodating groove to force the first slider is to move upward, the support rod is internally provided with a first top spring that is connected to the locking element, and through the first top spring, elastic force is applied to the locking element to force the first slider to move upward.

5. The roller shutter door fence according to claim 4, wherein one side of the second slider is provided with a guide groove, and the bottom of the upper connecting base is provided with a through groove that allows the second slider to vertically pass through, the through groove is connected to an inner part of the upper connecting base, and a first limiting portion in the through groove that extends into the guide groove is configured to press against a top of the guide groove to restrict the second slider from detaching from the through groove.

6. The roller shutter door fence according to claim 5, wherein a second top spring is provided in the guide groove, and upper and lower ends of the second top spring press against a bottom wall of the upper connecting base and a bottom wall of the guide groove, respectively, and elastic force is configured to be applied through the second top spring to the second slider to make the second slider move in a direction withdrawing from the through groove.

7. The roller shutter door fence according to claim 4, wherein a top wall of the third slider is provided with two adjacent signs, that is, a first sign and a second sign, a top wall of the upper connecting base is provided with an observation window connected to an interior of the upper connecting base, and the third slider moves until the locking element is pushed into an interior of the support rod, the first sign is aligned up and down with the observation window;

the third slider moves until the locking element extends into the accommodating groove so that the second indicator is aligned up and down with the observation window.

8. The roller shutter door fence according to claim 4, wherein positions inside the upper connecting base corresponding to upper and lower part of the third slider are provided with two moving channels, respectively, and top and bottom walls of the third slider are respectively provided with guiding portions for inserting the two moving channels, and the third slider is configured to move along the moving channels with an aid of the guiding portion and the moving channel.

9. The roller shutter door fence according to claim 4, wherein the first slot is partially open for the top of the support rod to pass through, a pressure groove is configured to push the locking element into the interior of the support rod.

10. The roller shutter door fence according to claim 4, wherein a position inside the upper connecting base corresponding to a top of the accommodating groove is provided with a locking position, and a top of the first slider is provided with a second limiting portion that is configured to press against with the locking position up and down to prevent the first slider from completely entering the accommodating groove.

11. The roller shutter door fence according to claim 2, wherein an edge of the free end of the roller shutter is provided with a kit for wrapping the support rod, and is also provided with a cap body for an insertion of one end of the support rod, and after the kit wraps the support rod, a top cap is configured to wrap and secure the top of the support rod to a top of the kit, and a bottom cap is configured to wrap and secure the bottom of the support rod to a bottom of the kit.

12. The roller shutter door fence according to claim 2, wherein a window is provided near the support rod at the free end of the roller shutter for easy gripping of the support rod.

13. The roller shutter door fence according to claim 6, wherein the upper connecting base is configured to be detachably inserted with a first insertion board, a back of the upper connecting base is provided with a first insertion slot for a bottom-up insertion of the first insertion board, and a first locking key having a first locking part and a first driving part is movably provided in the first insertion slot, the first insertion board is provided with a first locking position for an insertion of the first locking part, and after the first insertion board is inserted into the first insertion slot, the first locking part is inserted into the first locking position to restrict the first insertion board from exiting the first insertion slot, and in further a third top spring is provided to apply elastic force to the first locking key in a direction that allows the first locking part to be inserted into the first locking position.

14. The roller shutter door fence according to claim 13, wherein the column is provided with a movable base and the movable base is configured to move back and forth along the column.

15. The rolling shutter door fence according to claim 14, wherein the moving base includes a shell and a cover body, a groove is provided on a front side of the shell that fits the column, and the cover body is locked through a plurality of bolts to the front side of the shell and closes the groove to form a channel and the column partially covered.

16. The roller shutter door fence according to claim 15, wherein the shell has an open bottom, and a bracket is inserted into the shell from bottom to top and locked, the bracket is provided with a nut hole for the bolt to pass through, and a nut for screwing with the bolt is fixed in the nut hole.

17. The roller shutter door fence according to claim 14, wherein the movable base is detachably inserted with a second insertion board, a back of the movable base is provided with a second insertion slot for a bottom-up insertion of the second insertion board, and a second locking key having a second locking part and a second driving part is movably provided in the second insertion slot, the second insertion board is provided with a second locking position for an insertion of the second locking part, and after the second insertion board is inserted into the second insertion slot, the second locking part is inserted into the second locking position to restrict the second insertion board from exiting the second insertion slot, and in further a fourth top spring is provided to apply elastic force to the second locking key to make the second locking key move in a direction that allows the second locking part insert into the second locking position.

* * * * *